United States Patent [19]

Sweeney et al.

[11] Patent Number: 5,573,462

[45] Date of Patent: Nov. 12, 1996

[54] FLEXIBLE DUAL-RATE COUPLING

[75] Inventors: Shannon K. Sweeney; Andrew B. Swoyer, Jr., both of Erie, Pa.

[73] Assignee: Lord Corporation, Cary, N.C.

[21] Appl. No.: 162,558

[22] Filed: Dec. 6, 1993

[51] Int. Cl.[6] .................................................. F16D 3/76
[52] U.S. Cl. .............................................. 464/90; 464/160
[58] Field of Search .................................. 464/89, 90, 91, 464/92, 147, 160, 180

[56] References Cited

U.S. PATENT DOCUMENTS

| | | | |
|---|---|---|---|
| 2,869,340 | 1/1959 | Saberton . | |
| 3,245,229 | 4/1966 | Fädler | 464/90 |
| 3,557,573 | 1/1971 | Hänsgen | 464/90 |
| 3,727,431 | 4/1973 | Yokel . | |
| 3,952,546 | 4/1976 | Nakano et al. | 464/91 X |
| 4,182,138 | 1/1980 | McGuire | 464/92 |
| 4,257,242 | 3/1981 | Domer et al. . | |
| 4,467,753 | 8/1984 | Lange | 123/195 A |
| 4,516,956 | 5/1985 | Staiert | 464/89 |
| 4,693,354 | 9/1987 | Umeyama et al. | 464/90 X |
| 4,763,767 | 8/1988 | Lanzarini et al. | 464/92 X |
| 4,772,245 | 9/1988 | Readman et al. | 464/89 |
| 4,850,244 | 7/1989 | Eckel et al. | 464/89 X |
| 4,852,424 | 8/1989 | Grassmuck et al. | 464/89 |
| 4,861,313 | 8/1989 | Zeiser et al. | 464/89 |
| 4,927,403 | 5/1990 | Pate, Sr. | 464/89 |
| 4,938,723 | 7/1990 | Yoshimura et al. | 440/52 |
| 5,168,774 | 12/1992 | Andrä et al. | 464/89 X |
| 5,390,774 | 2/1995 | Thurston et al. | 464/89 X |

OTHER PUBLICATIONS

Dunlop Engineering, DUOLASTIK Brochure, Ref. M 284, Mar. 1971.
Lord Corp., DYNAFLEX Standard Elastomeric Flexible Couplings–LCD, PB–2200d, Aug. 1991, p. 10–15.

*Primary Examiner*—Daniel P. Stodola
*Assistant Examiner*—Eileen A. Dunn
*Attorney, Agent, or Firm*—Richard K. Thomson; Randall S. Wayland; James W. Wright

[57] ABSTRACT

A flexible dual-rate coupling (20) including an outer member (22), and inner member (24), and a free-floating intermediate member (26). First and second elastomers (28) and (44) provide the dual-rate spring rate characteristics for the coupling (20). First elastomer section (28) is disposed between pocket (50) formed in outer member (22) and outer surface (52) of intermediate member (26) and provides a first spring rate. Second elastomer (44) is disposed between intermediate member (26) and inner member (24) and provides a second spring rate. At a low load, one of the elastomer sections (28) or (44) is delimited (snubbed) to provide dual-rate features for the flexible coupling (20). Both the sections (28) and (44) are preferably pure shear sections which are bonded in the same bonding operation.

7 Claims, 5 Drawing Sheets

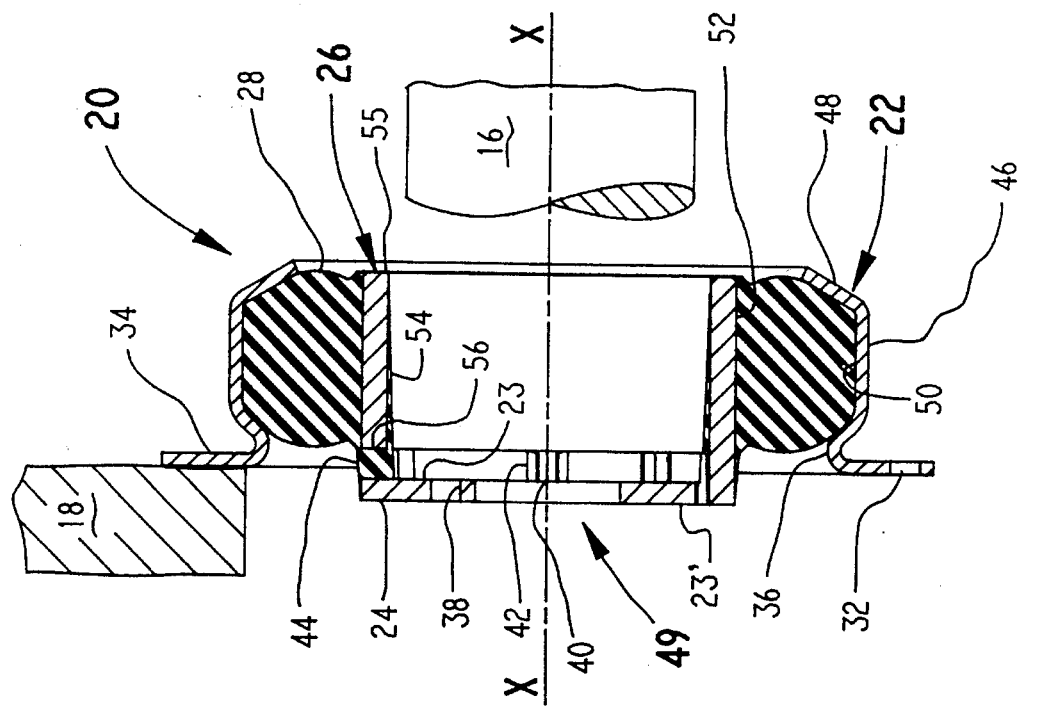
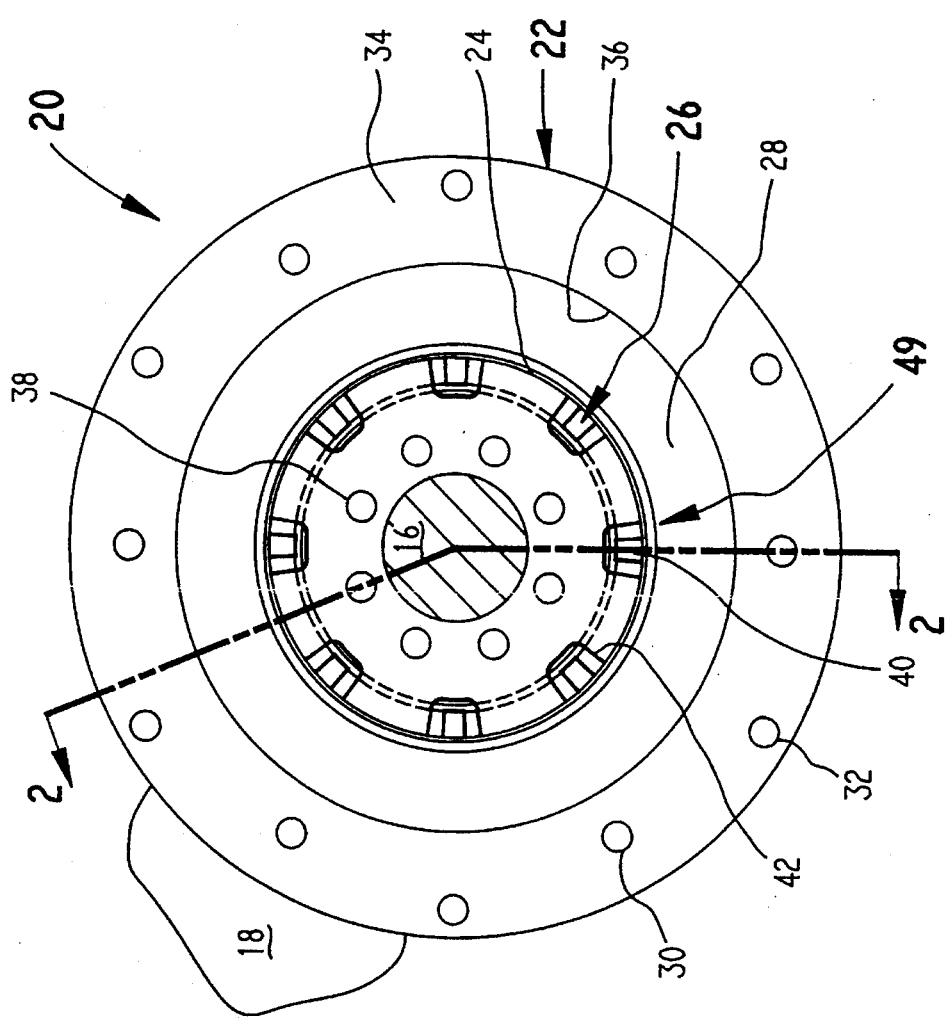

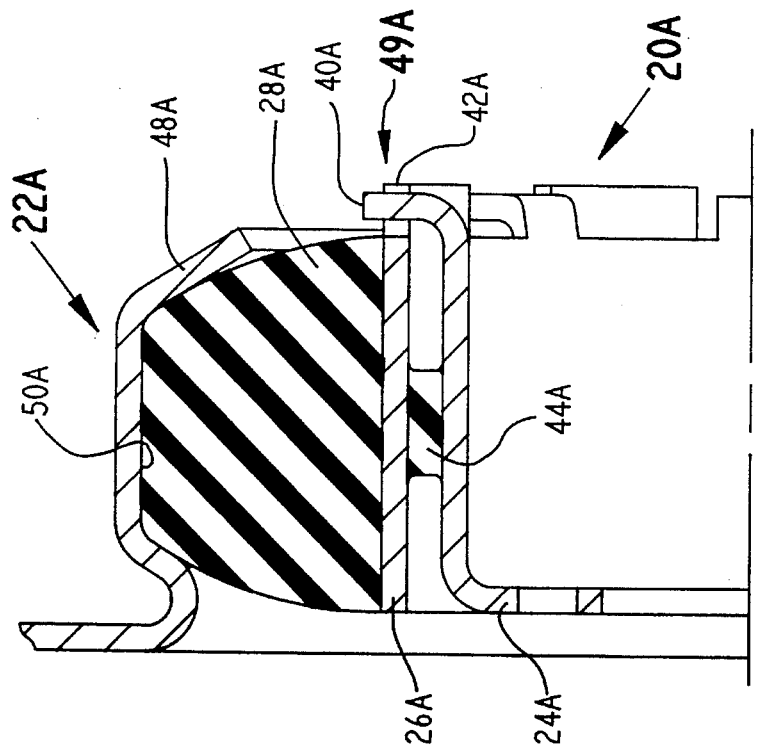
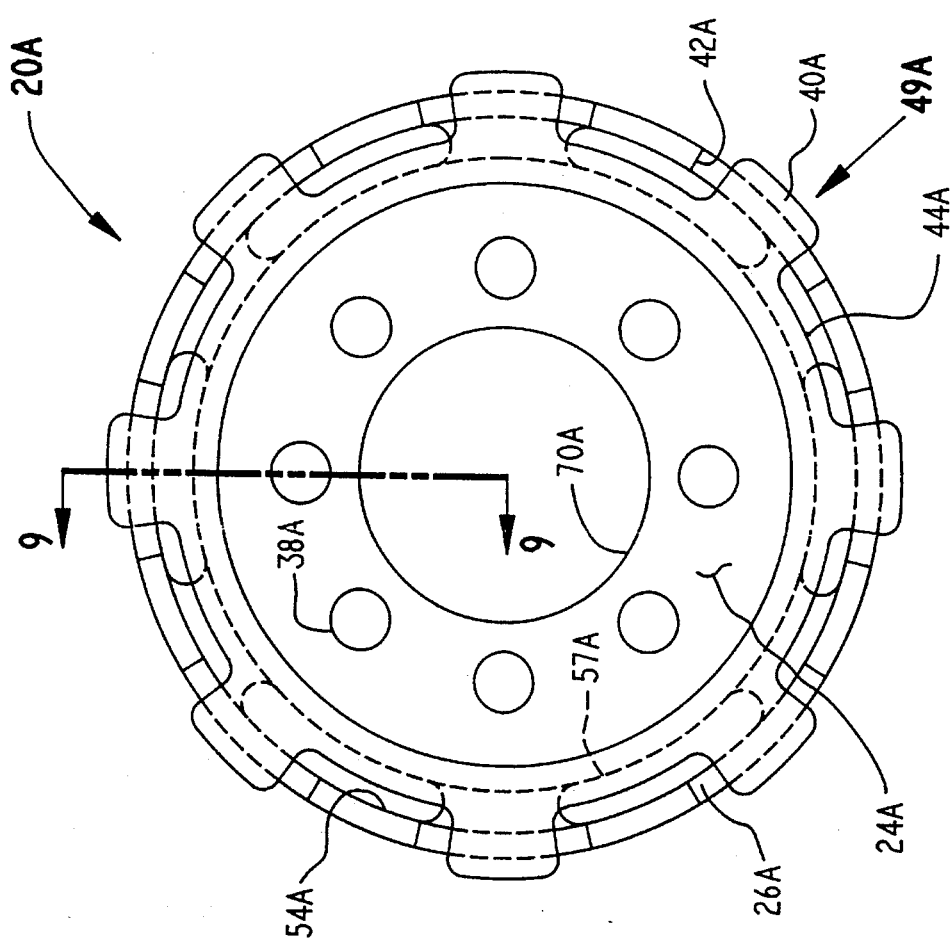
Fig. 9
Fig. 8

FLEXIBLE DUAL-RATE COUPLING

FIELD OF THE INVENTION

This invention relates to the area of couplings for transmitting torque and accommodating misalignment. More specifically, the invention relates to the area of flexible or resilient couplings which provide dual-rate spring rate characteristics.

BACKGROUND OF THE INVENTION

Flexible couplings have long been used between a driving member and a driven member to transmit torque and to accommodate axial, torsional or parallel, and angular misalignment. Flexible couplings tend to smooth torque variations from a power plant and can reduce driveline vibration due to vibrational resonances and the like. Additionally, couplings which exhibit predetermined torque limits are known, such as Dynafiex® flexible couplings available from Lord Corporation of Erie, Pa., the assignee of the current invention.

U.S. Pat. No. 4,938,723 to Yoshimura et al., which is hereby incorporated by reference herein, describes a torque limited coupling similar to the LC-type of Lord Dynafiex coupling wherein a low torsional spring rate is provided by a shear elastomer section for in line vibration isolation, yet when a predetermined torque limit is exceeded, the coupling slips within the housing 105 to prevent over-stressing of the shear elastomer section.

FIG. 3 of the '723 patent describes a coupling similar to the Lord LC Dynaflex flexible coupling which includes a housing 105, an elastomer 107, and an inner member 108. The elastomer 107 is bonded to the inner member 108, but not to the housing 105. The elastomer 107 is interference fitted within the housing 105 such that when the predetermined torque limit is exceeded, the elastomer 107 slips within the housing 105, thus, protecting the elastomer from being over-stressed. For some applications this coupling is inadequate because it only exhibits a single spring rate within the couplings operating range, i.e., before the torque limit is reached.

U.S. Pat. No. 2,869,340 to Saberton describes a shaft assembly which exhibits dual-rate characteristics. The coupling assembly includes a elastomer sleeve 11 comprising a first stiffness element. Buffer blocks 14 supply a secondary spring rate when the torque is large enough to allow buffer 14 to contact radial members 13. This coupling has several disadvantages in that it requires multiple assembly steps to attach the buffers 14 and 15. Furthermore, the buffer exhibits highly non-linear characteristics, i.e., it stiffens greatly upon being loaded because the buffer 14 is loaded in compression loading.

U.S. Pat. No. 4,861,313 to Zeiser et al. describes an elastomeric shaft coupling for concentric shafts which includes compliant portions 20 and 50 which further include teeth 90 and 92 which interact to limit or snub motion after a certain torque or deflection is met. This snubbing interaction provides a rigid connection for high torque loading upon meeting the torque or deflection limit. Although this coupling has the ability to carry high torque loads, it lacks the ability to smooth out torque variations when transmitting high loads because the connection is essentially rigid when the teeth interact to cause snubbing.

U.S. Pat. No. 3,727,431 to Yokel describes a flexible torsional coupling including a resilient material 20, an outer ring OR including an abutment 27, and an inner ring IR including an abutment 25. A skin of elastomer covers the abutment 25 and a cushion 35 is attached to the abutment 27. Under large torsional loads, abutment 25 formed on inner ring IR will contact abutment 27 formed on outer ring OR. Rubber cushion 35 prevents shock loads on components upon initiation of snubbing. Although this cushion 35 does tend to smooth out the torque variations somewhat, it is ineffective because the cushion is highly non-linear because it is a compression-loaded element.

U.S. Pat. No. 4,467,753 to Lange describes a vibration damper for use on an engine shaft. FIG. 4 of the '753 patent describes using an annular elastomer layer 66 bonded between a metal pulley and a plate 67. This shear elastomer element is effective in reducing shock loads during startup. However, it is only a single-rate device and does not include any means for protecting the elastomer from becoming over-stressed.

U.S. Pat. No. 4,257,242 to Domer et al. describes a resilient coupling including a first elastomer block 7, elastomer joints 10 and 11, armature $1_1$, and a core 8. This coupling provides an inner shear element 10 and 11. However, the second element 7 is a compression loaded element, and thus, is highly nonlinear. Furthermore, the only means for snubbing is for 1 and $1_1$ to contact which results in an undesirable abrupt, rigid, metal-to-metal connection.

For certain applications, such as in the driveline of a tractor, a flexible coupling is desirable for attaching between the engine flywheel and the transmission. It is desired that the coupling helps to smooth out torque variations and to reduce the resonant frequency of the shaft system. Without a coupling, the shaft resonance may, and usually does, lie within the operating range; therefore, a soft flexible coupling is desired to reduce the shaft resonance to a frequency well below the normal operating frequency range. However, this may introduce a secondary problem of large transient motions during startup and shutdown conditions due to the soft spring rate. These large motions can exceed the backlash of the gear train or transmission and create a noisy gear rattle which could possibly be a mechanically detrimental condition.

To solve this problem, it is thought desirable to include a dual-rate coupling. However, all of the prior art couplings are inadequate for this application because they lack the combination of functional features required. All of these devices described above lack the means for snubbing one section while allowing the other section to operate freely. Furthermore, the prior dual-rate couplings exhibit highly non-linear characteristics because at least one of the elastomer sections is loaded in pure compression.

SUMMARY OF THE INVENTION

Therefore, the present invention is directed to a flexible dual-rate coupling that includes a first elastomer section and a second elastomer section that function substantially in shear and where each elastomer section is bonded to a free-floating intermediate member. The term "free-floating" means that the intermediate member is flexibly suspended between two flexible elastomer sections. Further, the coupling includes means for snubbing one of the elastomer sections via its interaction with the intermediate member while allowing the other shear section to operate freely, thus, providing dual-rate features.

It is another aspect of the present invention that the first elastomer section, second elastomer section, and snubber are formed during an individual bonding cycle, thus reducing cost. It is another aspect that the second elastomer section exhibits a substantially lower shear stiffness than the first elastomer section. It is another aspect that the snubbing means is formed by intermeshing at least one axially extending recess formed on the intermediate member and at least one radially extending tab formed on an inner member.

It is a feature of the present invention to provide a coupling, comprising an outer member for attaching to a first member and including a surface for receiving elastomer, an intermediate member which is free-floating having first surface for receiving elastomer and a second surface for receiving elastomer, a first elastomer section exhibiting a first spring rate formed during a bonding process and interconnecting and disposed between said outer member's surface for receiving elastomer and said intermediate member's first surface for receiving elastomer, an inner member adjacent said intermediate member and including a surface for receiving elastomer, a second elastomer section formed during the same said bonding process and exhibiting a second spring rate interconnecting and disposed between said intermediate member second surface for receiving elastomer and said inner member surface for receiving elastomer, said second elastomer section being in series-spring relationship to said first elastomer section and forming a series-spring rate, snubbing means for delimiting said one of said first elastomer section and said second elastomer section such that the remaining undelimited spring rate dominates thereby forming a dual-rate spring rate characteristic.

It is an advantage of the present invention that a very soft spring rate can be provided during startup conditions, and a higher stiffness section can be provided for the operating condition, thus, during startup conditions any gear backlash is eliminated or reduced.

It is another advantage of the present invention that each section provides a linear spring rate throughout its operating load range.

It is another advantage that the present invention provides a dualrate coupling whereby at least one section is snubbed and the other is torque limited to protect the elastomer from over-stressing and also to protect the driveline components from being over-stressed.

The abovementioned and further objects, features and advantages of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings, FIG. 1 is a frontal view of the flexible dual-rate coupling;

FIG. 2 is a sectioned side view of the flexible dual-rate coupling as seen along line 2—2 in FIG. 1;

FIG. 8 is a frontal view of another embodiment of flexible dual-rate coupling;

FIG. 9 is a sectioned side view the other embodiment of flexible dual-rate coupling as seen along line 9—9 in FIG. 8.

DETAILED DESCRIPTION OF THE INVENTION

Figure 3:
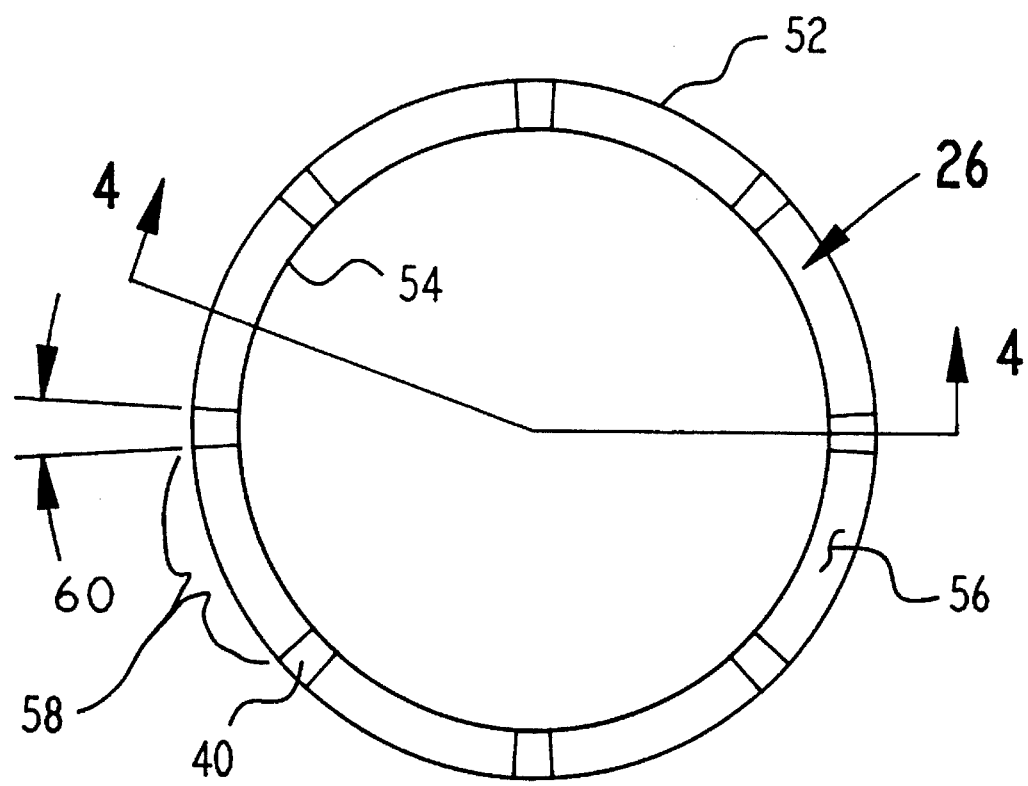
FIG. 3 is an end view of the intermediate member.

A flexible dual-rate coupling as seen in FIG. 1 at 20, exhibits dualrate spring rate characteristics. The coupling 20 is useful for attaching between a first member 16, such as a drive shaft, and a second member 18, such as a flywheel, and for accommodating torque transmitted between the members 16 and 18, while accommodating, axial, torsional or parallel, and angular misalignment between the members 16 and 18. The coupling 20 includes an outer member 22, an inner member 24, and an intermediate member 26 (only the axially extending tab portions of the intermediate member 24 can be seen in FIG. 1 ).

The outer member 22 includes a flange 34 which is radially extending and includes a first and second series of holes 30 and 32 each formed in a bolt pattern on and through flange 34. A first elastomer section 28 which exhibits a first spring rate is disposed between and interconnects the outer surface 52 (FIG. 2) of the intermediate member 26 and the outer member 22. The outer surface 52 (FIG. 2) acts as the first surface for receiving an elastomer. The first elastomer section 28 is bonded to the intermediate member 26 and is inserted into the outer member 22 through opening 36. The first elastomer section 28 preferably operates as a direct shear loaded section as well as a slip-torque device.

A second elastomer section 44 (FIG. 2) is bonded adjacent to, and is disposed between and interconnects, the end 56 (FIG. 2) of the intermediate member 26 and the inner member 24 and exhibits a second spring rate. The second elastomer section 44 is also a shear section which is loaded in direct shear under torsional loading.

The inner member 24 includes an inward facing surface 23 (FIG. 2) and an outward facing surface 23', is preferably stamped from a plate steel, and includes holes 38 formed in a bolt pattern for allowing attachment to first member 16 by way of bolts (not shown) or other like fastening means. Inward facing surface 23 (FIG. 2) acts as the surface for receiving elastomer. Radially directed recesses 42 formed on the inner member 24 operate with tabs 40 formed on intermediate member 26 (FIGS. 5 and 7) to form a snubber 49 which creates a means for delimiting (snubbing) the motion between the inner member 24 and intermediate member 26. By snubbing the tabs 40 against the recess 42, the second elastomer section 44 is essentially removed and the resultant coupling spring rate is dominated by the first elastomer section 28. Optionally, skins of elastomer may be placed on the tabs 40 or recesses 42 to lessen the impact at snubbing.

Figure 4:
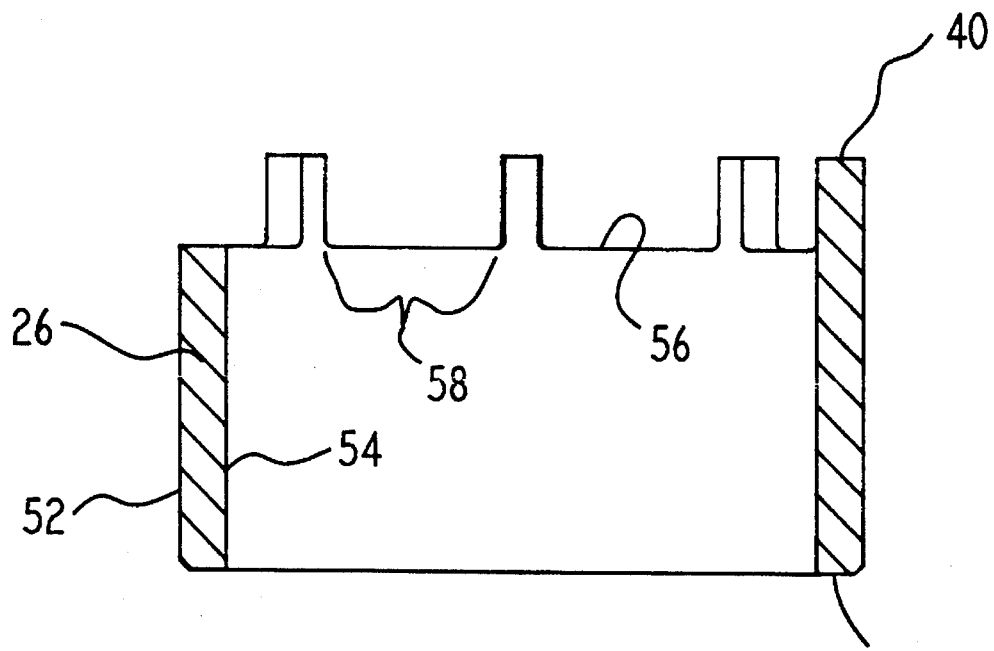
FIG. 4 is a sectioned side view of the intermediate member as seen along line 4—4 in FIG. 3.

FIG. 2 illustrates the coupling 20 in cross-section with only portions of members 16 and 18 shown for clarity. The intermediate member 26 is preferably cylindrically shaped and manufactured from steel wall tubing stock and includes an inner surface 54, an outer surface 52, and end surfaces 55 and 56 (FIGS. 3 and 4). The intermediate member 26 is also free-floating. The term free-floating means that the intermediate member 26 is suspended between two flexible sections, such as elastomer sections 28 and 44, not solidly or rigidly fastened to any other structure. The first elastomer section 28 is preferably annular in shape and is bonded to the outer surface 52 of the intermediate member 26. The first elastomer section 28 rests within pocket 50 within the outer member 22 formed by a wall 46, opening 36, and lip 48, but is not bonded thereto. The pocket 50 acts as a surface for receiving the elastomer. The outer member 22 is preferably a stamped steel component. Flange 34 on outer member 22 attaches to second member 18 by means of bolts (not shown) extending though holes 32. Holes 30 (FIG. 1) are for allowing free air flow in and around the coupling 20.

The first elastomer section 28 is inserted within the pocket 50 (acting as an inwardly-directed surface) in an interference fit condition such that the section 28 acts as a shear loaded element while undergoing torque loading as though it were bonded to pocket 50. The first elastomer section 28 is placed primarily in direct shear under application of torque loading. However, if a torque limit is exceeded, the first elastomer section 28 slips within the pocket 50, thus protecting the elastomer section 28 from becoming over-stressed. Furthermore, this torque limit protects driveline components from over-stressing due to torque spikes and the like. By varying the amount of precompression, i.e., interference fit, the torque limit (the point of slip) can be modified to slip at the desired design level of torque. By way of example and not by limitation, the static shear spring rate of the first elastomer section 28 of the coupling 20 is in a range between approximately 40,000 lb-in/rad and 60,000 lb-in/rad, the optimum being 50,000 lb-in/rad. The preferable material for the first elastomer section 28 is natural rubber having a modulus of between about 50 psi and 250 psi with an optimum of about 114 psi.

The second elastomer section 44 is also preferably a shear section, i.e., it encounters predominantly shear loading in torsion. The second elastomer section 44 is preferably a sandwich-type section and is preferably bonded between the end surface 56 of the intermediate member 26 and the inward-facing surface 23 of the inner member 24 by bonding means known to those of skill in the art. Clearly illustrated in FIGS. 2 is the snubber 49 including tabs 40 extending axially in a direction parallel to the axis X—X. Axially-extending tabs 40 interact with radially directed recesses 42 to delimit or snub the relative motion between the inner member 24 and the intermediate member 26.

By way of example and not by limitation, the static shear spring rate of the second elastomer section 44 is preferably in the range between about 5,715 lb-in/rad and 12,000 lb-in/rad with the optimum being 8,140 lb-in/rad. By way of example and not by limitation, the limits on the snubbers 49 are such that the second elastomer section 44 will snub at about 664 lb-in or at approximately 5° of relative torsional deflection between member 16 and 18 (FIG. 1). As the second elastomer section 44 is delimited (snubbed) under high loads, the spring rate of the first elastomer section 28 then predominates the overall spring rate of the coupling 20. When the second elastomer section 44 is not snubbed, the second elastomer section 44 and first elastomer section 28 combine in a series-spring relationship to provide an overall spring rate in the approximate range between 5,000 lb-in/rad and 10,000 lb-in/rad with an optimum of about 7,000 lb-in/rad. Therefore, after snubbing occurs, the overall spring rate of the coupling 20 gets stiffer. Preferably, the second elastomer section 44 is substantially softer than the first section 28 by a factor of 3:1 or more softer. It is a feature of the present invention that both sections are preferably linear throughout their operating ranges.

FIGS. 3 and 4 illustrate views of the intermediate member 26. The end view illustrates the at least one tab 40 that extends axially from the body of the intermediate member 26. Of course, preferably, there are multiple and equally-spaced tabs 40. The tabs 40 are formed by machining slots 58 on second end 56 of intermediate member 26. The tabs 40, after machining, have an approximate tab width 60.

Figure 5:
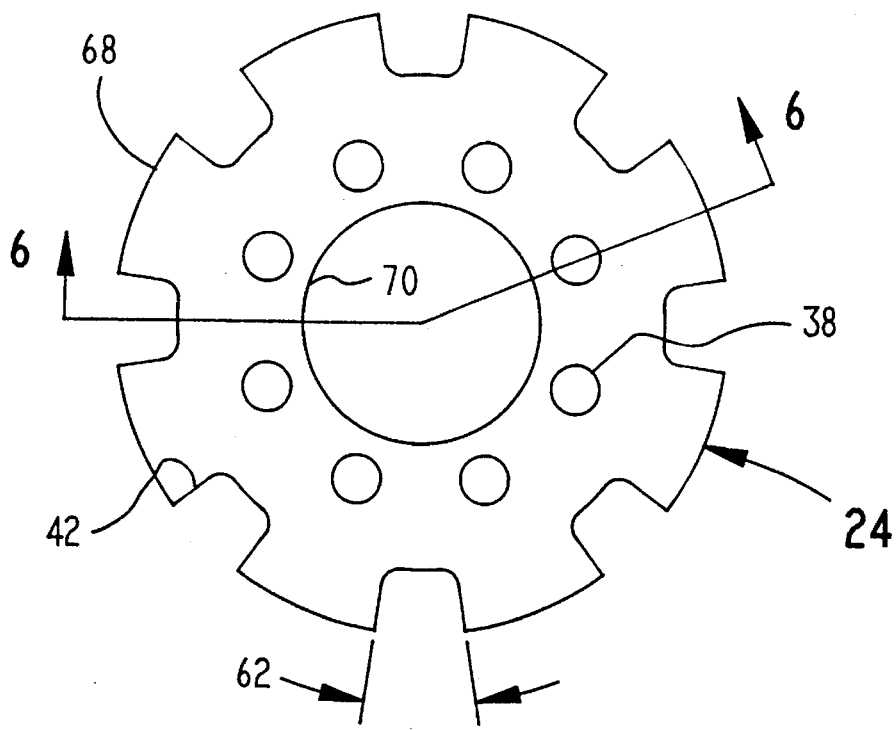
FIG. 5 is a frontal view of the inner member.
Figure 6:
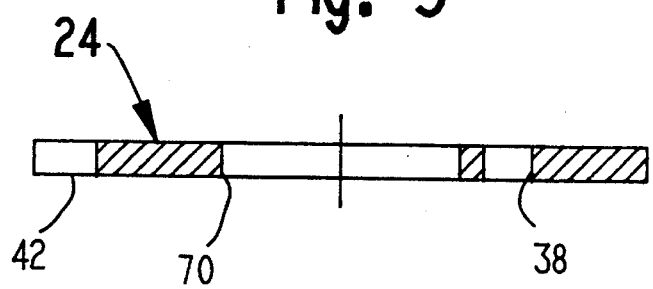
FIG. 6 is a sectioned side view of the inner member as seen along line 6—6 in FIG. 5.

FIG. 5 and 6 illustrate views of the inner member 24. The inner member 24 includes bore 70 for accepting a pilot on first member 16 (FIG. 1). The inner member 24 is preferably a stamped steel component and includes an outer periphery 68 and at least one recess 42 formed such that is preferably directed radially outward. Multiple and evenly-spaced recesses 42 are preferable. The recess 42 includes an approximate recess width 62.

Figure 7:
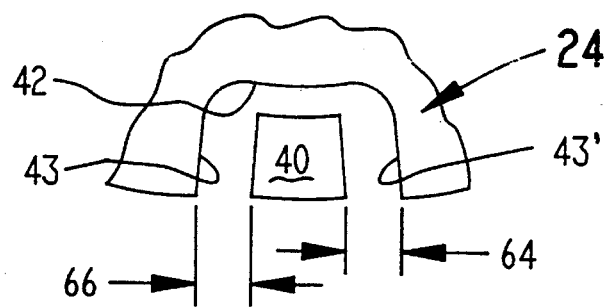
FIG. 7 is an enlarged view of the snubber.

FIG. 7 illustrates the snubber 49. In the free condition (without any torque applied), the inner member 24 and included recess 42 are situated relative to tab 40 such that the first gap 64 and the second gap 66 are approximately equal in width. Upon application of torque, the tab 40 rotates relative to recess 42. When the torque load is large enough, the tab 40 will contact the recess walls 43 or 43', depending on torque direction. Preferably, the snubbing will occur at about 5 degrees of relative windup between the members 16 and 18 (FIG. 1). Once snubbing occurs, the spring rate of the first elastomer section 28 (FIG. 1 ) dominates.

FIG. 8 illustrates a frontal view of a second embodiment of flexible dual-rate coupling 20A. In describing FIGS. 8 and 9, like numerals denote like members as compared to FIG. 1 through FIG. 7. The first elastomer section and outer member are not shown for clarity in FIG. 8. Furthermore, only half the section is shown in FIG. 9. The main difference between the first embodiment and the second embodiment is that the second elastomer 44A is bonded between the inner surface 54A of the intermediate member 26A and the outer surface 57A of the inner member 24A rather than to the end surface 56 of FIG. 2. The inner surface 54A of the intermediate member 26A and the outer surface 57A of the inner member 24A are preferably substantially parallel. Second elastomer section 44A is preferably made up of a series of individual spaced-apart elastomer segments. Similar to the previous embodiment, tabs 40A intermesh with recesses 42A to form snubber 49A. The difference being that the tabs 40A are radially extending in this embodiment.

FIG. 9 illustrates a partial sectional side view of the second embodiment of coupling 20A. As was mentioned above, the only major differences are that the inner member 24A is substantially a cup-shaped member and the elastomer section 44A is a tubeform-type section. The snubber 49A operates functionally the same way as the first embodiment. Preferably, the first elastomer section 28A is a slip-torque section and rests in pocket 50A formed in outer member 22A.

Figure 10:
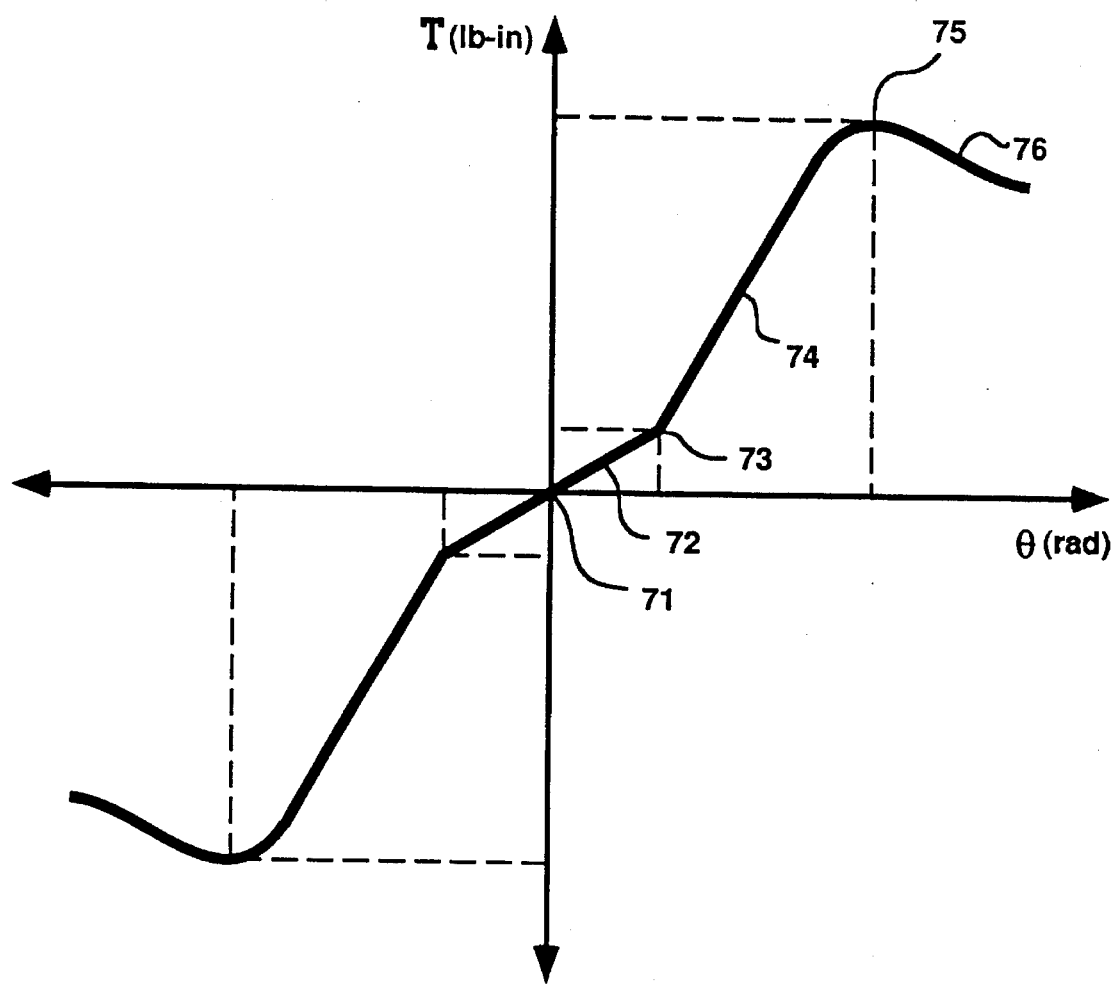
FIG. 10 is an illustration of the spring rate characteristics of a typical flexible dual-rate coupling.

FIG. 10 illustrates a representative spring rate curve of the coupling 20 showing torque T lb-in on the vertical axis and angular misalignment θ deg on the horizontal axis. The curve exhibits three distinct torsional spring rate sections 72, 74 and 76. Section 72 illustrates the torsional spring rate attributable to the series stiffnesses of the first elastomer section 28 (FIG. 1) and second elastomer section 44 (FIG. 1) combined. The second section 74 illustrates the resultant torsional spring rate of the first elastomer section 28 (FIG. 1) once the second elastomer section 44 (FIG. 1) is snubbed out. Section 76 illustrates the torsional spring rate when the first elastomer section 28 (FIG. 1) which is a slip-torque section has reached the torque limit and has slipped.

By way of example and not by limitation, the torque limit 75 is preferably about 20,000 lb-in and the snubbing limit 73 is preferably about 5°. The linearity of sections 72 and 74 is accomplished by making both sections operate in substantially pure shear loading. The zero torque point 71 illustrates the point of zero torque and deflection. The portion of the curve in the third quadrant illustrates the properties of the coupling 20 are approximately and preferably equal in either direction of torque application. By way of example and not by limitation, the coupling 20 usually will encounter about 1° of angular misalignment, 0.03 inch of radial misalignment and 0.06 inch of axial misalignment while in service. However, the coupling 20 has the capacity of handing much larger axial, radial, and angular misalignments.

In summary, the present invention relates to a dual-rate coupling which includes a first elastomer section disposed between an outer and an intermediate free-floating member and a second elastomer section disposed between said intermediate member and an inner member wherein one of the first and second elastomer sections is snubbed or delimited while the other is free to operate. The elastomer sections are preferably shear sections and the snubber is preferably comprised of at least one tab intermeshing and snubbing with at least one recess. None of the prior art couplings teach a dual-rate coupling with delimiting means for delimiting one of the shear-type sections, while allowing the other to operate freely.

While the preferred embodiment of the present invention has been described in detail, various modifications, alterations, changes and adaptations to the aforementioned may be made without departing from the spirit and scope of the present invention defined in the appended claims. It is intended that all such modifications, alterations and changes be considered part of the present invention.

What is claimed is:

1. A coupling, comprising:
   a) a flanged outer member for attaching to a first member and including an inner surface;
   b) a cylindrical intermediate member having an outer surface, an inner surface, and an end surface;
   c) a slip-torque elastomer section exhibiting a first spring rate disposed between said inner surface of said flanged outer member and said outer surface of said cylindrical intermediate member, said slip-torque elastomer section having a shear elastomer section which has an interference fit with a pocket formed on said inner surface of said flanged outer member and where said shear elastomer section slips within said pocket upon exceeding a relative torque limit;
   d) a plate member adjacent said end surface of said cylindrical intermediate member and including an inward-facing surface facing toward said end surface of said cylindrical intermediate member and an outward-facing surface opposed to said inward-facing surface;
   e) a shear sandwich elastomer section exhibiting a second spring rate which is disposed between said end surface of said cylindrical intermediate member and said inward-facing surface of said plate member, said shear sandwich elastomer section being arranged in series-spring relationship to said slip-torque elastomer section and resulting in a series spring rate for said coupling;
   f) a snubber including multiple tabs formed on said plate member for intermeshing with multiple recesses formed on said cylindrical intermediate member for delimiting said shear sandwich elastomer section under high loads such that said resulting spring rate equals said spring rate of said slip-torque elastomer section only.

2. A coupling of claim 1 wherein said slip-torque elastomer section exhibits a static shear spring rate in the range of 40,000 lb-in/rad to 60,000 lb-in/rad and said shear sandwich elastomer section exhibits a static shear spring rate in the range of 5,715 lb-in/rad to 12,000 lb-in/rad.

3. A coupling of claim 1 wherein said slip-torque elastomer section and said shear sandwich elastomer section are formed during the same bonding operation.

4. A coupling of claim 1 wherein said first member and a second member interconnected to said first member by said coupling comprise an engine flywheel and a transmission, respectively.

5. A coupling of claim 1 wherein said tabs are axially extending and said recesses are radially directed.

6. A coupling of claim 1 wherein said snubber snubs after about 660 lb-in of torque and said slip-torque elastomer section slips at about 20,000 lb-in.

7. A coupling, comprising:
   a) an outer member of said coupling for attaching to a first member and including an inner surface;
   b) an intermediate member of said coupling having an outer surface, an inner surface, and an end surface;
   c) a slip-torque section exhibiting a first spring rate disposed between said inner surface of said outer member and said outer surface of said intermediate member, said slip-torque section having a shear elastomer section which has an interference fit with a pocket formed on said inner surface of said outer member and where said shear elastomer section slips within said pocket upon exceeding a torque limit;
   d) an inner member adjacent one of said end surface of said intermediate member and said inner surface of said intermediate member and including a bonding surface formed thereon;
   e) a shear elastomer section exhibiting a second spring rate which is disposed between one of said end surface of said intermediate member and said inner surface of said intermediate member and said bonding surface of said inner member, said shear elastomer section being arranged in series-spring relationship to said slip-torque section and resulting in a series spring rate for said coupling; and
   f) snubbing means for delimiting said shear elastomer section under application of sufficient loads such that said shear elastomer section snubs out and a spring rate of said coupling results which is defined only as said spring rate of said slip-torque section.

* * * * *